United States Patent
Wang

(10) Patent No.: US 10,317,773 B2
(45) Date of Patent: Jun. 11, 2019

(54) DISPLAY ASSEMBLY AND DISPLAY APPARATUS

(71) Applicants: BOE TECHNOLOGY GROUP CO., LTD., Beijing (CN); BEIJING BOE DISPLAY TECHNOLOGY CO., LTD., Beijing (CN)

(72) Inventor: Zhidong Wang, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 15/745,075

(22) PCT Filed: Sep. 20, 2017

(86) PCT No.: PCT/CN2017/102419
§ 371 (c)(1),
(2) Date: Jan. 15, 2018

(87) PCT Pub. No.: WO2018/054297
PCT Pub. Date: Mar. 29, 2018

(65) Prior Publication Data
US 2019/0011802 A1 Jan. 10, 2019

(30) Foreign Application Priority Data

Sep. 23, 2016 (CN) .......................... 2016 1 0848542

(51) Int. Cl.
*G02F 1/03* (2006.01)
*G02F 1/07* (2006.01)
(Continued)

(52) U.S. Cl.
CPC .............. *G02F 1/31* (2013.01); *G02F 1/0311* (2013.01); *G02F 2201/34* (2013.01); *G02F 2202/022* (2013.01); *G02F 2203/01* (2013.01)

(58) Field of Classification Search
CPC ........ G02B 1/043; G02B 1/041; G02B 5/223; G02B 27/0172; G02B 3/005; G02B 5/201;
(Continued)

(56) References Cited

U.S. PATENT DOCUMENTS 6,819,471 B2 11/2004 Amundson et al.
6,961,167 B2 11/2005 Prins et al.
(Continued)

FOREIGN PATENT DOCUMENTS

CN  1513132 A   7/2004
CN  101160547 A  4/2008
(Continued)

OTHER PUBLICATIONS

International Search Report and Written Opinion in PCT/CN2017/102419 dated Nov. 29, 2017.
1st Office Action in CN201610848542.3 dated Jan. 14, 2019.

*Primary Examiner* — Brandi N Thomas
(74) *Attorney, Agent, or Firm* — Syncoda LLC; Feng Ma

(57) ABSTRACT

A display assembly includes a convex lens, a light-absorbing layer, and a refractive index-adjustable layer disposed therebetween. The refractive index-adjustable layer has a refractive index adjustable between less than, and no less than, a critical value, configured such that a light incident into the convex lens has a total reflection if the refractive index of the refractive index-adjustable layer is less than the critical value, and transmits through the refractive index-adjustable layer and reaches the light-absorbing layer for absorption if the refractive index of the refractive index-adjustable layer is no less than the critical value. The critical value can be a (Continued)

refractive index of the convex lens if it is in direct contact with the refractive index-adjustable layer, or can be a refractive index of a transparent film layer disposed between the convex lens and the refractive index-adjustable layer and in direct contact with the refractive index-adjustable layer.

20 Claims, 4 Drawing Sheets

(51) Int. Cl.
    *G02F 1/29*     (2006.01)
    *G02F 1/31*     (2006.01)

(58) Field of Classification Search
CPC ........ G02B 1/04; G02B 5/003; G02B 5/0236; G02B 5/188; G02B 5/20; G02B 5/208; G02B 3/06; G02B 3/08; G02B 5/02; G02B 6/003; G02B 6/0065; G02B 13/004; G02B 13/005; G02B 1/11; G02B 26/10; G02B 27/2214; G02B 27/283; G02B 3/0031; G02B 3/0056; G02B 3/14; G02B 5/0242; G02B 5/0278; G02B 5/282; G02B 5/3033; G02B 6/0043; G02B 7/04; G02B 9/04; H01L 2924/181; H01L 2924/00; H01L 2924/00012; H01L 2924/0002; H01L 51/5275; H01L 27/14625; H01L 27/14627; H01L 27/14632; H01L 27/14685; H01L 2933/0041; H01L 2933/0058; H01L 31/18; H01L 33/58; H01L 2224/48091; H01L 2924/12044; H01L 33/54; H01L 2224/14; H01L 2224/16225; H01L 2251/5315; H01L 27/14621; H01L 2924/00014; H01L 2933/0025; H01L 2933/0033; H01L 31/02366; H01L 33/0079; H01L 33/10; H01L 33/22; H01L 33/24; H01L 33/46; H01L 33/50
USPC ................ 359/237, 247, 265–267, 270–273, 359/290–292, 295, 298, 315, 321–322
See application file for complete search history.

(56) References Cited

U.S. PATENT DOCUMENTS

| | | | |
|---|---|---|---|
| 2009/0097114 A1* | 4/2009 | Mimura | ................ G02B 5/128 359/463 |
| 2010/0128340 A1 | 5/2010 | Whitehead | |

FOREIGN PATENT DOCUMENTS

| | | |
|---|---|---|
| CN | 103018931 A | 4/2013 |
| CN | 105911691 A | 8/2016 |
| WO | 2016109273 A1 | 7/2006 |
| WO | 2015175518 A1 | 11/2015 |

* cited by examiner

DISPLAY ASSEMBLY AND DISPLAY APPARATUS

CROSS-REFERENCE TO RELATED APPLICATION

The present application claims priority to Chinese Patent Application No. 201610848542.3, filed on Sep. 23, 2016, the disclosure of which is hereby incorporated by reference in its entirety.

TECHNICAL FIELD

The present disclosure is related generally to display technologies, and more specifically to a display assembly and a display apparatus.

BACKGROUND

Due to relatively low costs and high compatibility with current TFT-LCD manufacturing processes, the clear ink display technology has been a hot spot of research.

The clear ink display technology takes advantage of the following principle: when a light transmits from an optically denser medium into an optically thinner medium, total reflection occurs if an incident angle of the light is greater than a total reflection angle.

SUMMARY

In a first aspect, a display assembly is provided. The display assembly comprises a convex lens, a refractive index-adjustable layer, and a light-absorbing layer.

The refractive index-adjustable layer is disposed between a convex surface of the convex lens and the light-absorbing layer, and the refractive index-adjustable layer is configured to have a refractive index adjustable between less than, and no less than, a critical value, configured such that a light incident into the convex lens from a side opposing to the refractive index-adjustable layer has a total reflection to thereby realize a bright state for the display assembly if the refractive index of the refractive index-adjustable layer is less than the critical value, and that the light transmits through the refractive index-adjustable layer and reaches the light-absorbing layer for absorption to thereby realize a dark state for the display assembly if the refractive index of the refractive index-adjustable layer is no less than the critical value.

In some embodiments of the display assembly, the convex lens is in direct contact with the refractive index-adjustable layer, and the critical value is a refractive index of the convex lens.

In some other embodiments, the display assembly further includes a transparent film layer disposed between the convex lens and the refractive index-adjustable layer. The transparent film layer is in direct contact with the refractive index-adjustable layer, and the critical value is a refractive index of the transparent film layer.

In the display assembly, the refractive index-adjustable layer can comprise an electro-optic material layer or a piezoelectric material layer.

In some embodiments of the display assembly where the refractive index-adjustable layer comprises an electro-optic material layer, the display assembly further includes a first electrode layer and a second electrode layer. The first electrode layer is disposed between the convex lens and the electro-optic material layer, and comprises a transparent electrode material having a refractive index no less than the convex lens. The second electrode layer is disposed over a side surface of the electro-optic material layer opposing to the convex lens.

Herein, the first electrode layer and the second electrode layer are configured to receive a voltage to form an electrical field therebetween, wherein the electrical field is configured to cause a change of the refractive index of the electro-optic material layer from an initial refractive index in an absence of the electrical field.

In the display assembly as described above, a relationship between the change of the refractive index of the electro-optic material layer ($\Delta n$) and a strength of the electrical field between the first electrode layer and the second electrode layer (E) can be described using a formula:

$$\Delta n = n0^3 r E/2 = n0^3 r U/2d;$$

where n0 is the initial refractive index of the electro-optic material layer in an absence of the electrical field, r is an electro-optic coefficient of the electro-optic material layer, U is the voltage applied to the electro-optic material layer, and d is a thickness of the electro-optic material layer.

In some embodiments of the display assembly as described above, the initial refractive index of the electro-optic material layer is less than the critical value, and the voltage applied to the electro-optic material layer is configured to result in a second refractive index of the electro-optic material layer no less than the critical value.

In some other embodiments of the display assembly as described above, the initial refractive index of the electro-optic material layer is no less than the critical value, and the voltage applied to the electro-optic material layer is configured to result in a second refractive index of the electro-optic material layer less than the critical value.

In the display assembly as described above, the critical value can be the refractive index of the first electrode layer, and the second electrode layer can be the light-absorbing layer.

In the display assembly as described above, the electro-optic material layer can comprise an inorganic electro-optic material having an asymmetric center in a crystal structure thereof. According to some embodiments, the inorganic electro-optic material can have a composition of at least one of potassium dihydrogen phosphate, ammonium dihydrogen phosphate, lithium niobate, or lithium iodate.

In the display assembly as described above, the electro-optic material layer can comprise an organic electro-optic material. According to some embodiments, the organic electro-optic material can have a composition of polyurethane polymer, such as PMMA-AMA.

In the display assembly as described above, the convex lens can have a composition of resin, the first electrode layer can comprise ITO.

According to some embodiments of the display assembly, the convex surface of the convex lens is in a shape of a hemisphere or an ellipsoid.

In a second aspect, the disclosure further provides a display apparatus. The display apparatus comprises at least one display assembly, and each of the at least one display assembly is a display assembly according to any one of the embodiments as described above.

The display apparatus may, according to some embodiments, include a plurality of display assemblies, which are arranged in an array.

The display apparatus can be a mobile phone, a tablet, a TV set, a monitor, a notebook, a digital camera, or a GPS.

BRIEF DESCRIPTION OF THE DRAWINGS

To more clearly illustrate some of the embodiments, the following is a brief description of the drawings. The drawings in the following descriptions are only illustrative of some embodiment. For those of ordinary skill in the art, other drawings of other embodiments can become apparent based on these drawings.

DETAILED DESCRIPTION

In the following, with reference to the drawings of various embodiments disclosed herein, the technical solutions of the embodiments of the disclosure will be described in a clear and fully understandable way.

It is obvious that the described embodiments are merely a portion but not all of the embodiments of the disclosure. Based on the described embodiments of the disclosure, those ordinarily skilled in the art can obtain other embodiment(s), which come(s) within the scope sought for protection by the disclosure.

Figure 1A:
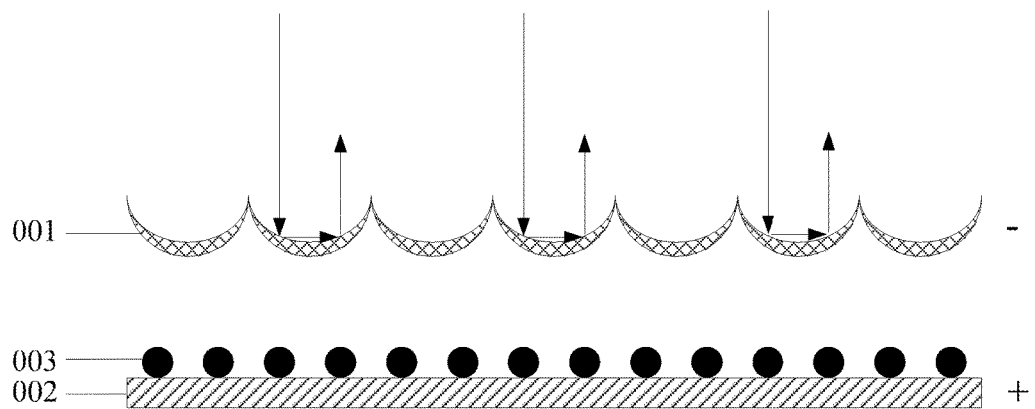
FIG. 1A is a structural diagram of a related clear ink technology-based reflective display device when it is in a bright state.
Figure 1B:
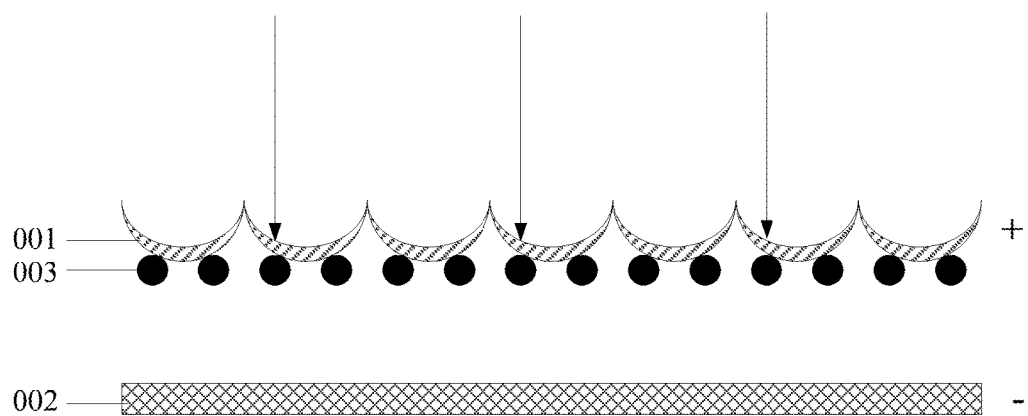
FIG. 1B is a structural diagram of a related clear ink technology-based reflective display device when it is in a dark state.

A structure of a reflective display device according to a current technology is illustrated in FIG. 1A and FIG. 1B. As shown in the figures, the reflective display device includes a reflector 001, a backplane 002, and black ink particles 003. The reflector 001 has a plurality of hemispherical reflecting surfaces, and the black ink particles 300 are surrounded by a medium and are disposed between the reflecting surfaces of the reflector 001 and the backplane 003.

When the reflector 001 and the backplane 002 are not charged or when the reflector 001 is negatively charged and the backplane 002 is positively charged (as shown in FIG. 1A), the black ink particles 003 are located in a proximity to the backplane 002, and because of the surrounding by the medium having a low refractive index, the reflector 001 can reflect lights from an environment to thereby realize a bright state for the reflective display device.

When the reflector 001 is positively charged and the backplane 002 is negatively charged (as shown in FIG. 1B), the reflecting surfaces of the reflector 001 are surrounded by the black ink particles 003, and the lights from the environment are thus absorbed by the black ink particles 003, thereby realizing a black state for the reflective display device.

As such, by controlling the electrical field of different pixels, different images can be displayed by the reflective display device.

In the above mentioned reflective display device, the transition between reflection and absorption of the lights from the environment is realized by means of the black ink particles 003. However, the reflective display device based on the current technology has the following disadvantageous issues: a manufacturing process involving particles is typically complex; the black ink particles 003 are susceptible to aggregation, commonly leading to an uneven coloring; and the relatively long time period needed for movement of the black ink particles 003 leads to a relatively longer response time.

In order to address the disadvantageous issues associated with a related reflective display device, such as the complex manufacturing process, susceptibility to aggregation, and the relatively long response time, the present disclosure provides a display assembly and a display apparatus comprising the same.

In a first aspect, a display assembly is disclosed. The display assembly includes a convex lens, a refractive index-adjustable layer, and a light-absorbing layer.

The refractive index-adjustable layer is disposed between a convex surface of the convex lens and the light-absorbing layer. The refractive index-adjustable layer is configured to have a refractive index adjustable between less than, and no less than, a critical value.

The critical value for the refractive index-adjustable layer is configured such that a light incident into the convex lens from a side opposing to the refractive index-adjustable layer can have a total reflection to thereby realize a bright state for the display assembly if the refractive index of the refractive index-adjustable layer is less than the critical value, and can transmit through the refractive index-adjustable layer and reaches the light-absorbing layer for absorption to thereby realize a dark state for the display assembly if the refractive index of the refractive index-adjustable layer is no less than the critical value.

Herein, the critical value can be a refractive index of the convex lens if the convex lens is in direct contact with the refractive index-adjustable layer. The critical value can also be a refractive index of a transparent film layer disposed between the convex lens and the refractive index-adjustable layer, wherein the transparent film layer is in direct contact with the refractive index-adjustable layer.

Figure 2:
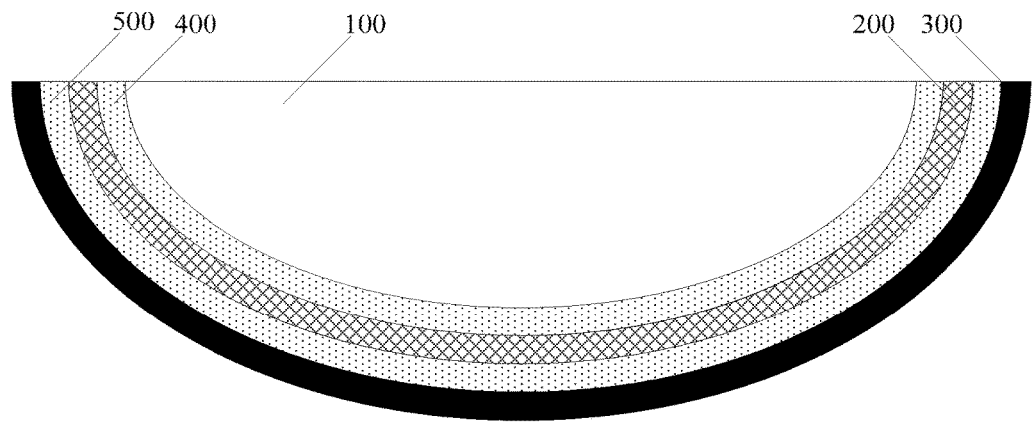
FIG. 2 shows a structural diagram of a display assembly according to some embodiments of the present disclosure.
Figure 3:
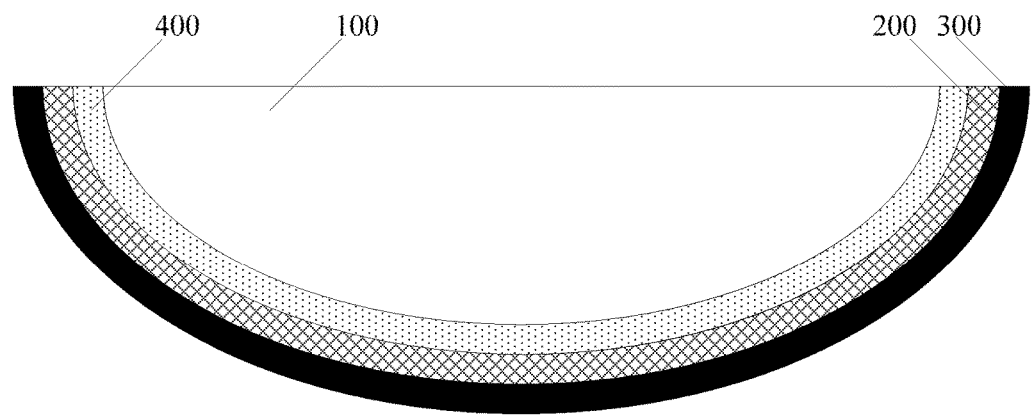
FIG. 3 shows a structural diagram of a display assembly according to some other embodiments of the present disclosure.

FIG. 2 and FIG. 3 illustrate a structural diagram of a display assembly according to two embodiments of the present disclosure.

As shown in these two figures, the display assembly comprises a hemispherical convex lens 100, a refractive index-adjustable layer 200, and a light-absorbing layer 300, which are sequentially disposed (i.e. the refractive index-adjustable layer 200 is disposed over an outer surface of the hemispherical convex lens 100, and the light-absorbing layer 300 is disposed over an outer surface of the refractive index-adjustable layer 200.

In the display assembly disclosed herein, a hemispherical surface of the hemispherical convex lens 100 can be configured to be in contact with the refractive index-adjustable layer 200, and a light incident into the hemispherical convex lens 100 is configured to transmit to the refractive index-adjustable layer 200.

The refractive index-adjustable layer 200 is configured to have a variable refractive index that can be adjusted between a first value and a second value, wherein the first value is less than a refractive index of the hemispherical convex lens 100, and the second value is no less than (i.e. equal to or more than) the refractive index of the hemispherical convex lens 100. As such, the refractive index of the hemispherical convex lens 100 is substantially the above mentioned critical value for the refractive index-adjustable layer 200.

In the display assembly as described above, by adjusting the refractive index of the refractive index-adjustable layer 200, the brightness and darkness (i.e. a bright state and a dark state) of the display assembly can be controlled.

Specifically, on the one hand, if the refractive index of the refractive index-adjustable layer 200 is less than the refractive index of the hemispherical convex lens 100, the light incident into the hemispherical convex lens 100 can have a total reflection at an interface between the hemispherical convex lens 100 and the refractive index-adjustable layer 200, thereby realizing the bright state for the display assembly.

On the other hand, if the refractive index of the refractive index-adjustable layer 200 is no less than (i.e. equal to, or more than) the refractive index of the hemispherical convex lens 100, the light incident into the hemispherical convex lens 100 can transmit through the refractive index-adjustable layer 200 to reach the light-absorbing layer 300, which in turn absorbs the light to thereby realize the dark state for the display assembly.

In the display assembly as described above, the brightness and darkness of the display assembly can be controlled by adjusting the refractive index of the refractive index-adjustable layer 200 instead of adjusting the black ink particles in the conventional clear ink technologies.

As such, there is no need for manufacturing the black ink particles. Consequently, the manufacturing process can be simplified, and the issues such as the uneven coloring due to the susceptibility of the black ink particles to aggregation, and the relatively slow response (i.e., relatively long response time) due to the relatively long movement time of the black ink particles can be avoided.

It is noted that in the display assembly as described above, the hemispherical convex lens 100 can have a shape of a hemisphere, but can also have a shape other than a hemisphere, for example, can have a shape that is close to a hemisphere, or can have a shape that is convex in a direction from the convex lens 100 to the light-absorbing layer 300.

It is also noted that a transparent film having a different shape may be employed to replace the hemispherical convex lens 100 in a display assembly according to some embodiments of the present disclosure, as long as a curved surface of the transparent film allows a total reflection for lights incident from an environment. There are no limitations herein.

In the display assembly as described above, the refractive index-adjustable layer 200 can be an electro-optic material layer, or a piezoelectric material layer, but can also be a layer of other materials having a variable refractive index. There are no limitations herein.

Because a refractive index of an electro-optic material layer can be adjusted according to a strength of an electrical field that is applied to the electro-optic material layer, thus if the refractive index-adjustable layer 200 comprises an electro-optic material layer, the display assembly as shown in FIG. 2 further comprises a first electrode layer 400 and a second electrode layer 500.

Herein, the first electrode layer 400 is disposed between the electro-optic material layer and the hemispherical convex lens 100, and the second electrode layer 500 is disposed over a side surface of the electro-optic material layer distal to the hemispherical convex lens 100.

Furthermore, the first electrode layer 400 comprises a transparent electrode material (e.g., ITO) such that the light incident into the hemispherical convex lens 100 can transmit through the first electrode layer 400 to reach the electro-optic material layer of the refractive index-adjustable layer 200.

It is noted that the first electrode layer 400 is substantially the transparent film layer as mentioned above, which is in direct contact with the refractive index-adjustable layer, and a refractive index of the first electrode layer 400 is substantially the above mentioned critical value for the refractive index-adjustable layer 200.

The hemispherical convex lens 100 can comprise a transparent material, such as resin. In some embodiments of the display assembly, a refractive index of the hemispherical convex lens 100 can be similar to (i.e. substantially same as) the refractive index of the first electrode layer 400.

The second electrode layer 500 may comprise a material that is identical to the transparent material of the first electrode layer 400, and may comprise a non-transparent material. It is noted that according to some embodiments, the second electrode layer 500 comprises a non-transparent material and a transparent material.

If the second electrode layer 500 comprises a non-transparent material, the light-absorbing layer 300 can integrate with the second electrode layer 500 to thereby form one single film layer as illustrated in FIG. 3. In other words, the light-absorbing layer 300 essentially have a dual function of being the second electrode and of light absorption.

In the embodiments of the display assembly as described above, by applying a voltage to the first electrode layer 400 and the second electrode layer 500 to generate an electrical field, the refractive index of the electro-optic material layer can be adjusted according to the linear electro-optic effect.

Specifically, the relationship between a change of the refractive index of the electro-optic material layer ($\Delta n$) and a strength of the electrical field generated between the first electrode layer 400 and the second electrode layer 500 (E) can be described using the formula:

$$\Delta n = n_0^3 r E/2 = n_0^3 r U/2d;$$

where $n_0$ is an initial refractive index of the electro-optic material layer (i.e. the refractive index of the electro-optic material layer if no electrical field is applied thereto), r is an electro-optic coefficient of the electro-optic material layer, U is a voltage applied to the electro-optic material layer, and d is a thickness of the electro-optic material layer.

In the embodiments of the display assembly as described above, depending on the composition of the electro-optic material layer, the initial refractive index of the electro-optic material layer (i.e., the refractive index of the electro-optic material layer when there is no electrical field applied thereto) can be less than the refractive index of the first electrode layer 400 and the hemispherical convex lens 100, and as such, the light incident into the hemispherical convex lens 100 can have a total reflection to thereby form the bright state of the display assembly.

Correspondingly, after a voltage is applied to the electro-optic material layer, the refractive index of the electro-optic material layer becomes substantially equal to, or more than, the refractive index of the first electrode layer 400 and the hemispherical convex lens 100, and as such, the light incident into the hemispherical convex lens 100 can transmit through the refractive index-adjustable layer 200 to reach the light-absorbing layer 300, which in turn absorbs the light to thereby form the dark state of the display assembly.

Alternatively, in the embodiments of the display assembly as described above, depending on the composition of the electro-optic material layer, the initial refractive index of the electro-optic material layer (i.e., the refractive index of the electro-optic material layer when there is no electrical field applied thereto) is configured to be substantially equal to, or more than, the refractive index of the first electrode layer 400 and the hemispherical convex lens 100, and as such, the light incident into the hemispherical convex lens 100 can transmit through the refractive index-adjustable layer 200 to reach the light-absorbing layer 300, which in turn absorbs the light to thereby form the dark state of the display assembly Correspondingly, after a voltage is applied to the electro-optic material layer, the refractive index of the electro-optic material layer becomes less than the refractive index of the first electrode layer 400 and the hemispherical convex lens 100, and as such, the light incident into the hemispherical convex lens 100 can have a total reflection to thereby form the bright state of the display assembly.

It is noted that in the above embodiments of the display assembly, the refractive index of the hemispherical convex lens 100 is substantially same as the refractive index of the first electrode layer 400, and thus the critical value as mentioned above is substantially the refractive index of the first electrode layer 400 and the hemispherical convex lens 100.

In the embodiments of the display assembly as described above, the electro-optic material layer can comprise an inorganic electro-optic material having an asymmetric center in the crystal structure. Specifically, the inorganic electro-optic material can be potassium dihydrogen phosphate, ammonium dihydrogen phosphate, lithium niobate, or lithium iodate.

Alternatively, the electro-optic material layer can comprise an organic electro-optic material, and one specific example of the organic electro-optic material can be polyurethane polymer.

In the following, one specific embodiment of the display assembly is provided as an illustrating example, where the electro-optic material layer comprises PMMA-AMA (full name?). In this display assembly, the initial refractive index n2 of the electro-optic material layer is 1.49, and the refractive index n1 of the hemispherical convex lens 100 and the first electrode layer 400 is about 2.

Figure 4A:
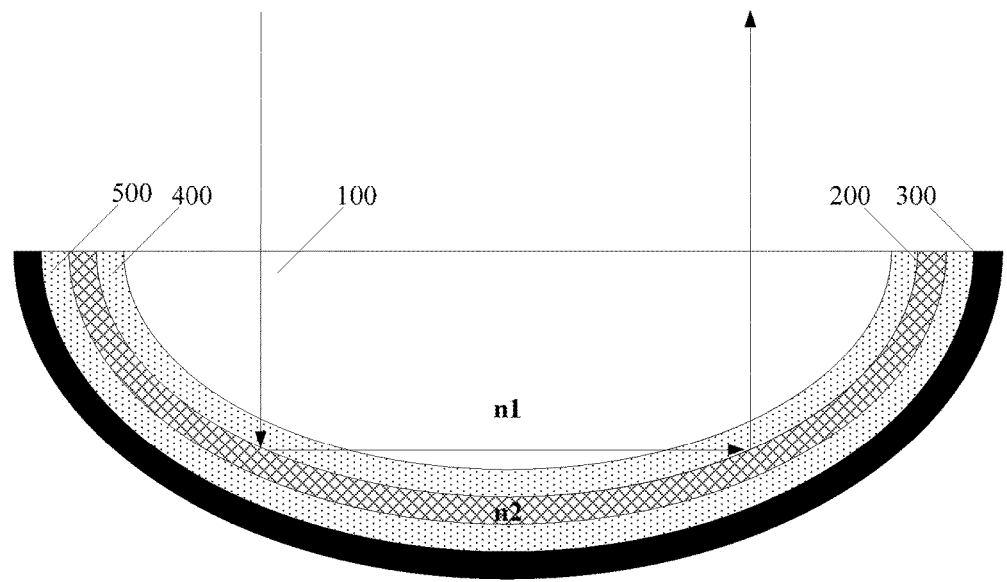
FIG. 4A illustrates a working principle of the display assembly as shown in FIG. 2 when it is in a bright state.

Thus, as illustrated in FIG. 4A, if there is no electrical field applied to the first electrode layer 400 and the second electrode layer 500, a light incident into the hemispherical convex lens 100 transmits through the hemispherical convex lens 100 and the first electrode layer 400, and reaches a surface of the electro-optic material layer (i.e., the interface between the first electrode layer 400 and electro-optic material layer).

Because the condition of total reflection is satisfied at the interface when a light enters from an optically denser medium into an optically thinner medium, total reflection occurs, thereby forming the bright state for the display assembly.

The electro-optic coefficient of PMMA-AMA is 300 pm/V. In the above-mentioned embodiment of the display assembly, the thickness of the electro-optic material layer is 10 nm, and if a voltage of 10 V is applied to the first electrode layer 400 and the second electrode layer 500, thus when all the parameters are fed into the formula:

$$\Delta n = n_0^3 rE/2 = n_0^3 rU/2d = \{(1.49)^3 * 300 * 10^{12} * 10\} / \{2 * 9.6 * 10^{-9}\} = 0.51.$$

Thus the refractive index has an increase of about 0.51. Accordingly, the refractive index of the electro-optic material layer n3 from the initial refractive index (i.e. n2=1.49) to add the calculated change of the refractive index of the electro-optic material layer (i.e. $\Delta n = 0.51$), which becomes about 2, which is substantially equal to the refractive index (i.e. n1 is about 2) of the hemispherical convex lens 100 and the first electrode layer 400.

Figure 4B:
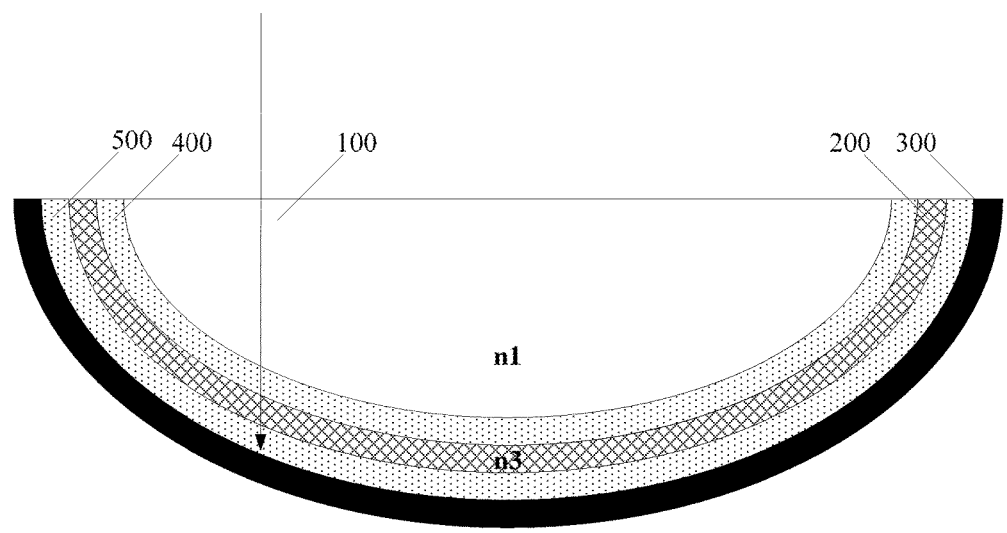
FIG. 4B illustrates a working principle of the display assembly as shown in FIG. 2 when it is in a dark state.

As illustrated in FIG. 4B, a light entering into the hemispherical convex lens 100 transmits through the hemispherical convex lens 100 and the first electrode layer 400, and reaches a surface of the electro-optic material layer (i.e., the interface between the first electrode layer 400 and electro-optic material layer). Because there is no total reflection occurring at the interface between the first electrode layer 400 and electro-optic material layer, the light can transmit through the electro-optic material layer and the second electrode layer 500 to reach the light-absorbing layer 300, which can absorb the light to thereby form the dark state of the display assembly.

It should be noted that besides the above embodiments where the first electrode layer 400 has a substantially equal refractive index to the hemispherical convex lens 100, in some other embodiments of the display assembly, the refractive index of the first electrode layer 400 can be more than the refractive index of the hemispherical convex lens 100 to thereby allow the light incident into the hemispherical convex lens 100 to transmit through the first electrode layer 400 to reach the electro-optic material layer.

Similarly to the embodiments of the display assembly as described above, in order for the light that has entered through the first electrode layer 400 to have a total reflection at the interface between the first electrode layer 400 and the electro-optic material layer to thereby realize a bright state for the display assembly, the refractive index of the electro-optic material layer needs to be less than the refractive index of the first electrode layer 400; and in order for the light that has entered through the first electrode layer 400 to transmit through the electro-optic material layer to be subsequently absorbed by the light-absorbing layer 300 to thereby realize a dark state for the display assembly, the refractive index of the electro-optic material layer needs to be equal to, or higher, than the refractive index of the first electrode layer 400.

As such, in some embodiments of the display assembly, the refractive index of the electro-optic material layer can be adjusted from being lower than the refractive index of the first electrode layer 400 to becoming substantially equal to, or higher than, the refractive index of the first electrode layer 400 to thereby realize a switch from the bright state to the dark state for the display assembly.

Alternatively, in some other embodiments, the refractive index of the electro-optic material layer can be adjusted from being substantially equal to, or higher than, the refractive index of the first electrode layer 400 to becoming lower than the refractive index of the first electrode layer 400 to thereby realize a switch from the dark state to the bright state for the display assembly.

In a second aspect, the present disclosure further provides a display apparatus, which comprises at least one above-mentioned display assembly.

Figure 5:
FIG. 5 is a structural diagram of a display apparatus according to some embodiments of the present disclosure.

According to some embodiments as shown in FIG. 5, the display apparatus comprises a plurality of display assemblies, arranged in an array, wherein each display assembly is based on the display assembly according to any one of the embodiments as described above.

Herein the display apparatus can be a mobile phone, a tablet, a TV set, a monitor, a notebook, a digital camera, a GPS, or any electronic device or electronic component having display functionality. There are no limitations herein.

In the display apparatus disclosed herein, each display assembly comprises a hemispherical convex lens, a refractive index-adjustable layer, and a light-absorbing layer, which are consecutively disposed over one another. A hemispherical surface of the hemispherical convex lens is configured to be in contact with the refractive index-adjustable layer. The refractive index-adjustable layer is configured to have a variable refractive index that can be adjusted between a value less than, and a value no less than, a refractive index of the hemispherical convex lens. The brightness and darkness of the display assembly can be controlled by adjusting the refractive index of the refractive index-adjustable layer.

Specifically, if the refractive index of the refractive index-adjustable layer is less than the refractive index of the hemispherical convex lens, a light incident into the hemispherical convex lens can have a total reflection to thereby realize a bright state for the display assembly; and if the refractive index of the refractive index-adjustable layer is no less than the refractive index of the hemispherical convex lens, the light incident into the hemispherical convex lens can transmit through the refractive index-adjustable layer to reach the light-absorbing layer, which in turn absorbs the light to thereby realize the dark state for the display assembly.

In the display assembly as described above, because the brightness and darkness of the display assembly can be controlled by means of the refractive index-adjustable layer instead of the black ink particles in the conventional technologies, there is no need for manufacturing the black ink particles. Consequently, the manufacturing process can be simplified, and the issues such as the uneven coloring due to the susceptibility of the black ink particles to aggregation, and the relatively slow response (i.e., relatively long response time) due to the relatively long movement time of the black ink particles can be avoided.

All references cited in the present disclosure are incorporated by reference in their entirety. Although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the exemplary embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

The invention claimed is:

1. A display assembly, comprising a convex lens, a refractive index-adjustable layer, and a light-absorbing layer, wherein:
the refractive index-adjustable layer is disposed between a convex surface of the convex lens and the light-absorbing layer; and
the refractive index-adjustable layer is configured to have a refractive index adjustable between less than, and no less than, a critical value, configured such that a light incident into the convex lens from a side opposing to the refractive index-adjustable layer:
has a total reflection to thereby realize a bright state for the display assembly if the refractive index of the refractive index-adjustable layer is less than the critical value; and
transmits through the refractive index-adjustable layer and reaches the light-absorbing layer for absorption to thereby realize a dark state for the display assembly if the refractive index of the refractive index-adjustable layer is no less than the critical value.

2. The display assembly of claim 1, wherein:
the convex lens is in direct contact with the refractive index-adjustable layer; and
the critical value is a refractive index of the convex lens.

3. The display assembly of claim 1, further comprising a transparent film layer, disposed between the convex lens and the refractive index-adjustable layer, wherein:
the transparent film layer is in direct contact with the refractive index-adjustable layer; and
the critical value is a refractive index of the transparent film layer.

4. The display assembly of claim 1, wherein the refractive index-adjustable layer comprises an electro-optic material layer or a piezoelectric material layer.

5. The display assembly of claim 4, wherein the refractive index-adjustable layer comprises an electro-optic material layer, and the display assembly further comprises:
a first electrode layer, disposed between the convex lens and the electro-optic material layer, and comprising a transparent electrode material having a refractive index no less than the convex lens; and
a second electrode layer, disposed over a side surface of the electro-optic material layer opposing to the convex lens;
wherein:
the first electrode layer and the second electrode layer are configured to receive a voltage to form an electrical field therebetween, wherein the electrical field is configured to cause a change of the refractive index of the electro-optic material layer from an initial refractive index in an absence of the electrical field.

6. The display assembly of claim 5, wherein a relationship between the change of the refractive index of the electro-optic material layer ($\Delta n$) and a strength of the electrical field between the first electrode layer and the second electrode layer (E) is described using a formula:

$$\Delta n = n_0^3 rE/2 = n_0^3 rU/2d;$$

where $n_0$ is the initial refractive index of the electro-optic material layer in an absence of the electrical field, r is an electro-optic coefficient of the electro-optic material layer, U is the voltage applied to the electro-optic material layer, and d is a thickness of the electro-optic material layer.

7. The display assembly of claim 6, wherein the initial refractive index of the electro-optic material layer is less than the critical value, and the voltage applied to the electro-optic material layer is configured to result in a second refractive index of the electro-optic material layer no less than the critical value.

8. The display assembly of claim 6, wherein the initial refractive index of the electro-optic material layer is no less than the critical value, and the voltage applied to the electro-optic material layer is configured to result in a second refractive index of the electro-optic material layer less than the critical value.

9. The display assembly of claim 5, wherein the critical value is the refractive index of the first electrode layer.

10. The display assembly of claim 5, wherein the second electrode layer is the light-absorbing layer.

11. The display assembly of claim 5, wherein the electro-optic material layer comprises an inorganic electro-optic material having an asymmetric center in a crystal structure thereof.

12. The display assembly of claim 11, wherein the inorganic electro-optic material comprises at least one of potassium dihydrogen phosphate, ammonium dihydrogen phosphate, lithium niobate, or lithium iodate.

13. The display assembly of claim 5, wherein the electro-optic material layer comprises an organic electro-optic material.

14. The display assembly of claim 13, wherein the organic electro-optic material comprises polyurethane polymer.

15. The display assembly of claim 14, wherein the polyurethane polymer comprises PMMA-AMA.

16. The display assembly of claim 5, wherein the convex lens comprises resin.

17. The display assembly of claim 5, wherein the first electrode layer comprises ITO.

18. The display assembly of claim 1, wherein the convex surface of the convex lens is in a shape of a hemisphere or an ellipsoid.

19. A display apparatus, comprising at least one display assembly, wherein each of the at least one display assembly is a display assembly according to claim 1.

20. The display apparatus according to claim 19, comprising a plurality of display assemblies, arranged in an array.

* * * * *